(12) United States Patent
Eatough et al.

(10) Patent No.: US 7,565,544 B1
(45) Date of Patent: Jul. 21, 2009

(54) SYSTEMS AND METHODS FOR VERIFYING THE TRUSTWORTHINESS OF A FILE COMPRISING COMPUTER INSTRUCTIONS

(75) Inventors: David A. Eatough, Herriman, UT (US); Alan B. Butt, Orem, UT (US)

(73) Assignee: LANDesk Software, Inc., South Jordan, UT (US)

( * ) Notice: Subject to any disclaimer, the term of this patent is extended or adjusted under 35 U.S.C. 154(b) by 831 days.

(21) Appl. No.: 11/098,719

(22) Filed: Apr. 4, 2005

(51) Int. Cl.
*G06F 9/00* (2006.01)
(52) U.S. Cl. .................. 713/176; 713/161; 713/165; 713/180
(58) Field of Classification Search ............... 713/176, 713/161, 165, 180
See application file for complete search history.

(56) References Cited

U.S. PATENT DOCUMENTS

| 6,266,811 | B1 | 7/2001 | Nabahi |
| 2003/0014479 | A1 | 1/2003 | Shafron et al. |

*Primary Examiner*—Thomas Peeso
(74) *Attorney, Agent, or Firm*—Austin Rapp & Hardman

(57) ABSTRACT

An exemplary method involves receiving a request to process a file comprising computer instructions. The file may be a script, a source code file, a binary file, etc. The method also involves identifying a digital signature embedded in comments within the file. The method also involves attempting to validate the digital signature. If the digital signature is validated, the file is processed. If the digital signature is not validated, the file is not processed. The file may include multiple digital signatures. When this occurs, the file may be processed only if all of the multiple digital signatures are validated. Alternatively, the file may be processed if any of the multiple digital signatures are validated.

40 Claims, 10 Drawing Sheets

```
1022 →  ┌─ 1032 ─┬── 1034 ──┬─ 1036 ─┬──────── 1024 ────────────────┐
         REM     CBA8 signature C8C31940  MIIDtTCCAp2gAwIBAgIEC rva4TANBgkqhkiG9w0BAQ 1030 →  ┌ldpgp.exe┐┌decompress┐ -f "%0" -o "c:\message.txt" ┌-e BAT┐
         1044      1046                     1048            1050 type c:\message.txt
                                                                            ┐
        REM -----BEGIN PGP MESSAGE-----                                      │
        REM Version: LANDesk ® OpenPGP 8.1.0.22                              │
        REM                                                            1026  │
        REM  yP8AAACOAnicHY5BEoMwDAO/ohsX/tBDT32GCyZxm8SMYyj8voaDZyTNSOun1nVzthGy4NQNs7bB ┐
        REM  oSs3eCYHH+IIMeXw01G1cvMRL/RMpSApuhtJyg7Xa8JQ6aOGmZzwpvbt+IInEHa2E4UsMeilazOS 1040
        REM  7HxzCcaraTKqVVq6slHmG0cJi0YnoMG/n5oKkz3+7jNDrg==                 ┘
        REM  =N9wH
        REM -----END PGP MESSAGE-----                                        ┘
```

FIG. 10

```
REM extract and display the embedded documents
pgpextract.exe "%0"
type c:\message.txt
type c:\two.txt
type c:\three.txt
REM -----BEGIN PGP MESSAGE-----
REM Version: LANDesk ® OpenPGP 8.1.0.22
REM
REM yP8AAACOAnicHY5BEoMwDAO/ohsX/tBDT32GCyZxm8SMYyj8voaDZyTNSOun1nVzthGy4NQNs7bB
REM oSs3eCYHH+IIMeXw01G1cvMRL/RMpSApuhtJyg7Xa8JQ6aOGmZzwpvbt+IInEHa2E4UsMeilazOS
REM 7HxzCcaraTKqVVq6siHmG0cJi0YnoMG/n5oKkz3+7jNDrg==
REM  =N9wH
REM -----END PGP MESSAGE-----
REM -----BEGIN PGP MESSAGE-----
REM Version: LANDesk ® OpenPGP 8.1.0.22
REM
REM A9kdDkjDD/E/ielsDI+iAO/ohsX/tBDT32GCyZxm8SMYyj8voaDZyTNSOun1nVzthGy4NQNs7bBa
REM tBDT32GdydxmdSMYaj8vaaDdyfdh+bvDDFS+IInEHa2E4UsMeilazO/DDkdiDjDJDDDLKDSJILLD
REM 4Hxz344raTKqVVq6sSsdfd43D0Y4oSDfsDFSkzDSFFDSdrg==
REM  =UwC3
REM -----END PGP MESSAGE-----
REM -----BEGIN PGP MESSAGE-----
REM Version: LANDesk ® OpenPGP 8.1.0.22
REM
REM AAAddEFDLJDKJIKSDJL+/jdIdDSjsdDDT32GCyZxm8SMYyj8voaaraTKqVVq6siHmG0cJi0YDudD
REM ++dIskD5KKnshsKf4gs3SD2DB/RMpSApuhtJ337Xa8JQ6aOGmdsfjsiD:KIEJSDJkckDJoDJIEOS
REM 7777Cca5aTk3VV46si3mG03Ji3saDjkI32732z3+7jNDrg==
REM  =CDeS
REM -----END PGP MESSAGE-----
```

FIG. 10A

SYSTEMS AND METHODS FOR VERIFYING THE TRUSTWORTHINESS OF A FILE COMPRISING COMPUTER INSTRUCTIONS

TECHNICAL FIELD

The present invention relates generally to computer system administration. More specifically, the present invention relates to systems and methods for efficiently performing tasks related to maintaining and supporting computer systems.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 10 illustrates another exemplary script that may be used;

FIG. 10A illustrates another exemplary script that may be used;

DETAILED DESCRIPTION

Figure 1:
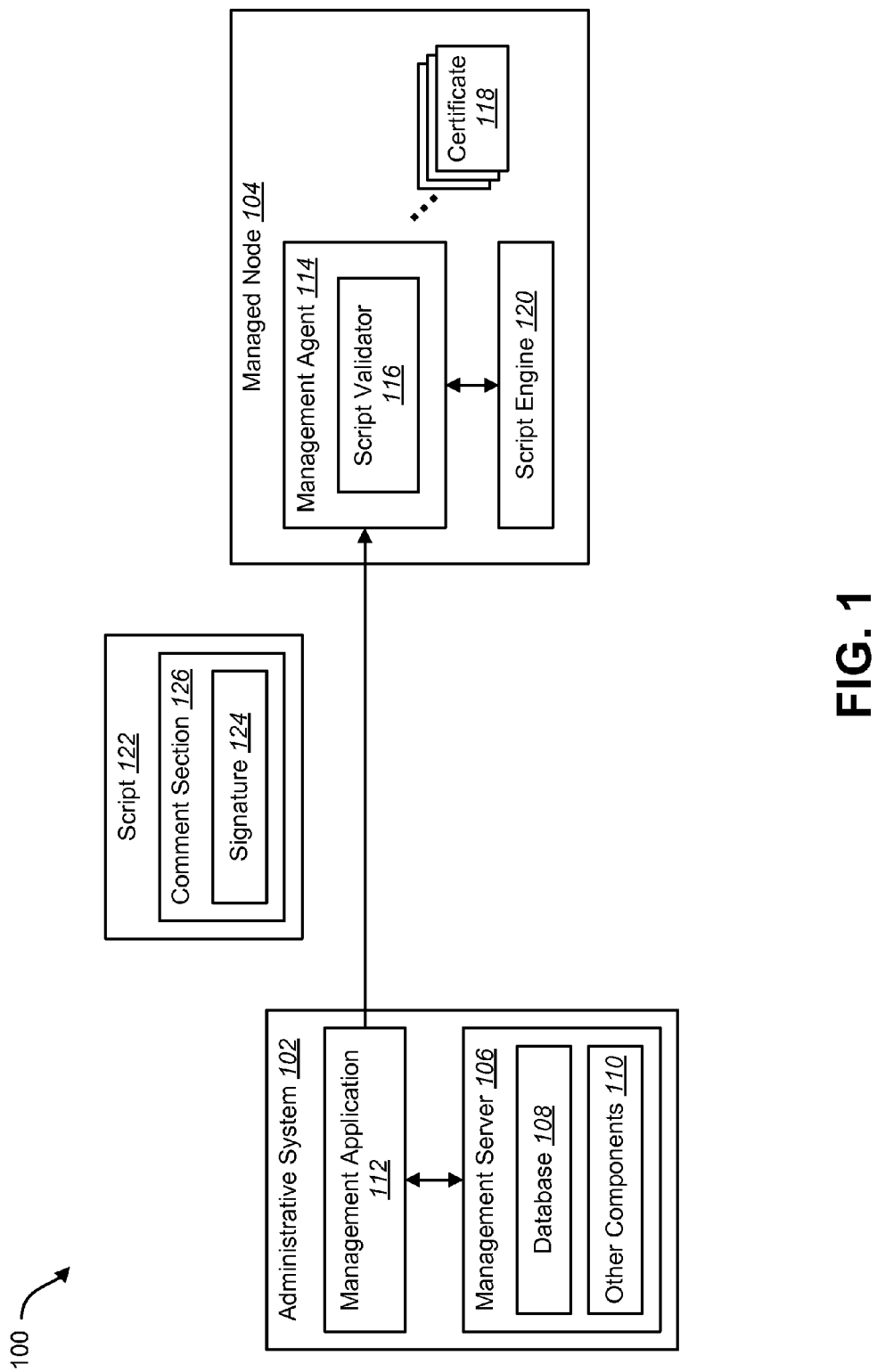
FIG. 1 illustrates an exemplary system in which some embodiments may be practiced.

A method for verifying the trustworthiness of a file comprising computer instructions is disclosed. The method involves receiving a request to process a file comprising computer instructions. The file may be a script, a source code file, a binary file, etc. A script validator identifies a digital signature that is embedded in comments within the file. The script validator attempts to validate the digital signature. If the digital signature is validated, the script validator processes the file. If the digital signature is not validated, the script validator does not process the file.

In some embodiments, the script validator also determines whether a connection through which the request is received is authenticated. In such embodiments, the script validator may perform the step of attempting to validate the signature only if the connection is not authenticated.

In some embodiments, the file may comprise multiple digital signatures. In such embodiments, the script validator may attempt to validate all of the multiple digital signatures, and the file may be processed only if all of the multiple digital signatures are validated. Alternatively, the file may be processed if any of the multiple digital signatures are validated.

The method may be performed by a managed node in a computer network. In such embodiments, the request to process the file may be received from an administrative system for the computer network. Alternatively, the request may be received from an original equipment manufacturer system.

A computer system that is configured to implement a method for verifying the trustworthiness of a file comprising computer instructions is also disclosed. The computer system includes a processor, and memory in electronic communication with the processor. Instructions are stored in the memory. The instructions are executable to implement a method that involves receiving a request to process a file comprising computer instructions. The method also involves identifying a digital signature embedded in comments within the file. The method also involves attempting to validate the digital signature. If the digital signature is validated, the file is processed. If the digital signature is not validated, the file is not processed.

A computer-readable medium comprising executable instructions for implementing a method for verifying the trustworthiness of a file comprising computer instructions is also disclosed. The method involves receiving a request to process a file comprising computer instructions. The method also involves identifying a digital signature embedded in comments within the file. The method also involves attempting to validate the digital signature. If the digital signature is validated, the file is processed. If the digital signature is not validated, the file is not processed.

A file that is configured to allow verification of the file by a validator on a computer system is also disclosed. The file includes computer instructions. In some embodiments, the file may be a script. The file includes a signature comment line. A comment indicator is provided at the beginning of the signature comment line. A signature tag is provided within the signature comment line. A digital signature is provided within the signature comment line. In some embodiments, multiple digital signatures may be provided. In some embodiments, a certificate identifier is provided within the signature comment line.

A method for simplifying the process of receiving updates, or new software, for a computer system is disclosed. The method involves a script engine receiving a request to process a script that comprises here document data. The script may be a batch file, and the here document data may be binary file data. The script engine receives the script, and processes the script. In response to processing the script, the script engine launches a here document utility. The here document utility reads the here document data from the script and writes the here document data to a file.

In some embodiments, in response to processing the script, the here document utility may decrypt the here document data. The here document utility may, alternatively or in addition, decompress the here document data.

The method may additionally involve a script validator identifying a digital signature in the script. The script validator may attempt to validate the digital signature. In some embodiments, the script engine processes the script only if the digital signature is validated.

Alternatively, the method may involve the script validator identifying multiple digital signatures in the batch file. The script validator may attempt to validate all of the multiple digital signatures. In some embodiments, the script engine processes the batch file only if all of the multiple digital signatures are validated. Alternatively, the script validator may attempt to validate at least one of the multiple digital signatures, and the script engine may process the batch file if any of the multiple digital signatures are validated.

The method may be performed by a managed node in a computer network. In such embodiments, the request may be received from an administrative system for the computer network. Alternatively, the request may be received from an original equipment manufacturer system.

A computer system that is configured to implement a method for simplifying the process of receiving updates, or new software, for a computer system is also disclosed. The computer system includes a processor, and memory in electronic communication with the processor. The computer system also includes a script engine and a here document utility. Instructions are stored in the memory. The instructions are executable to implement a method that involves the script engine receiving a request to process a script that comprises here document data. The script engine receives the script. The script engine processes the script. In response to processing the script, the script engine launches the here document utility. The here document utility reads the here document data from the script and writes the here document data to a file.

A computer-readable medium comprising executable instructions for implementing a method for simplifying the process of receiving updates, or new software, for a computer system is also disclosed. The method involves a script engine receiving a request to process a script that comprises here document data. The script engine receives the script. The script engine processes the script. In response to processing the script, the script engine launches the here document utility. The here document utility reads the here document data from the script and writes the here document data to a file.

A script that simplifies the process of updating a computer system is also disclosed. The script includes here document data. The script also includes a launch command that instructs a script engine to launch a here document utility. The script also includes an input command that instructs the here document utility to read the here document data from the script. The script also includes an output command that instructs the here document utility to write the here document data to a file.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary system 100 in which some embodiments may be practiced. An administrative computer system 102 is connected to a computer network (not shown), such as a corporate local area network (LAN). The administrative system 102 is used to manage other computer systems that are also connected to the computer network. These other computer systems will be referred to herein as "managed nodes." For simplicity, only a single managed node 104 is shown in the system 100 of FIG. 1. Of course, the systems in which embodiments disclosed herein are practiced may include many additional managed nodes.

The administrative system 102 includes a management server 106. The management server 106 may include a database 108 of information. The management server 106 may also include various other components 110 that are configured to perform tasks such as scheduling, handling alerts, and so forth. An example of a management server 106 that may be used with embodiments disclosed herein is the core server for the LANDesk® Management Suite.

The administrative system 102 also includes a management application 112. The management application 112 may be used to perform various tasks related to the management of the computer network, such as remote control, software distribution, software license monitoring, operating system imaging and migration, IT asset management, problem resolution, and so forth. As part of performing these tasks, the management application 112 may connect to the management server 106 and query the management server 106 for information. An example of a management application 112 that may be used is the console application for the LANDesk® Management Suite.

To enable a user of the administrative system 102 to perform management tasks via the management application 112, the managed node 104 includes a management agent 114. The management agent 114 performs management-related tasks in response to requests from the management application 112.

Scripts are frequently used to carry out management-related tasks. As used herein, the term "script" may refer to a shell script, a batch file, a program written in a scripting language (e.g., JavaScript, Perl, Python, etc.), and so forth. A user of the administrative system 102 may create a script that, when executed, will carry out certain management-related tasks. The script may then be sent to the management agent 114 on the managed node 104. The management agent 114 passes the script to a script engine 120 for execution.

It may not be desirable for the script engine 120 to execute every script that it receives. Some scripts may contain malicious code that is intended to perform destructive actions on the managed node 104 and/or elsewhere on the computer network. Therefore, when the management agent 114 receives a script, it would be beneficial for the management agent 114 to be able to verify the trustworthiness of the script before the script is executed.

In the illustrated embodiment, this functionality is achieved with a script validator 116 that is included in the management agent 114. In general terms, the script validator 116 determines whether scripts that the management agent 114 receives are trustworthy and should be executed.

Scripts that are sent to the managed node 104 may include one or more digital signatures that may be used to verify the trustworthiness of the script. For example, FIG. 1 shows a script 122 being sent from the management application 112 on the administrative system 102 to the management agent 114 on the managed node 104. A digital signature 124 is embedded in a comment section 126 of the script 122. In addition, one or more trusted certificates 118 are stored on the managed node 104. The script validator 116 determines whether the signature 124 in the script 122 was created by using a private key that corresponds to one of the trusted certificates 118. If it was, then the script 122 is executed. If not, then the script 122 is not executed. Additional details about various embodiments of the script validator 116 will be provided below.

Figure 2:
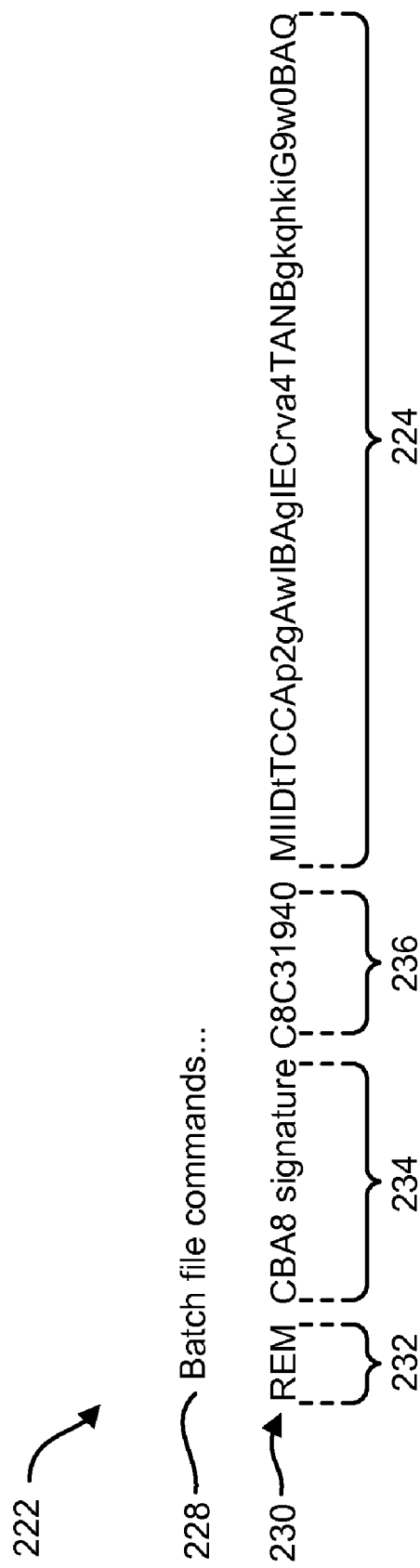
FIG. 2 illustrates an exemplary script that may be used.

FIG. 2 illustrates an exemplary script 222 that may be used. The script 222 shown in FIG. 2 is a batch file 222. The batch file 222 includes one or more batch file commands 228.

The batch file 222 also includes a signature comment line 230. The signature comment line 230 begins with a comment indicator 232. The specific comment indicator that is used depends on the type of script that is being used. In the illustrated embodiment, the comment indicator 232 is REM, which is the comment indicator for Windows/DOS batch files.

The signature comment line 230 also includes a signature tag 234. In the illustrated embodiment, the signature tag 234 is the string CBA8 signature. (CBA8 stands for Common Bootstrap Agent, version 8, which is an example of a management agent 114 that may be used.) The signature tag 234 is located toward the beginning of the comment line 230, right after the comment indicator 232. In alternative embodiments, the signature tag may be located at the end of the signature comment line, or at both the beginning and the end of the signature comment line.

The signature comment line 230 also includes a certificate identifier 236 and a digital signature 224. The certificate identifier 236 identifies the certificate 118 that is associated with the private key that was used to create the digital signature 224. In the illustrated embodiment, the certificate identifier 236 is a hash for the certificate 118, i.e., the result of applying a hash algorithm to the certificate 118.

The digital signature 224 is created by calculating a digest of the contents of the batch file (using a hash algorithm such as SHA-1 or MD5) and encrypting the digest of the batch file 222 using the private key that is associated with the certificate 118 corresponding to the certificate identifier 236. All components of the script 222 that will be evaluated by the script validator 116 are encrypted. The digital signature 224 does not include the signature data itself, i.e., the signature comment line 230 is not part of the data that is used to create the digital signature 224. Other comments and end of line characters may be part of the data that is encrypted to create the digital signature 224. Alternatively, other comments and end of line characters may be ignored when the digital signature 224 is created.

Figure 3:
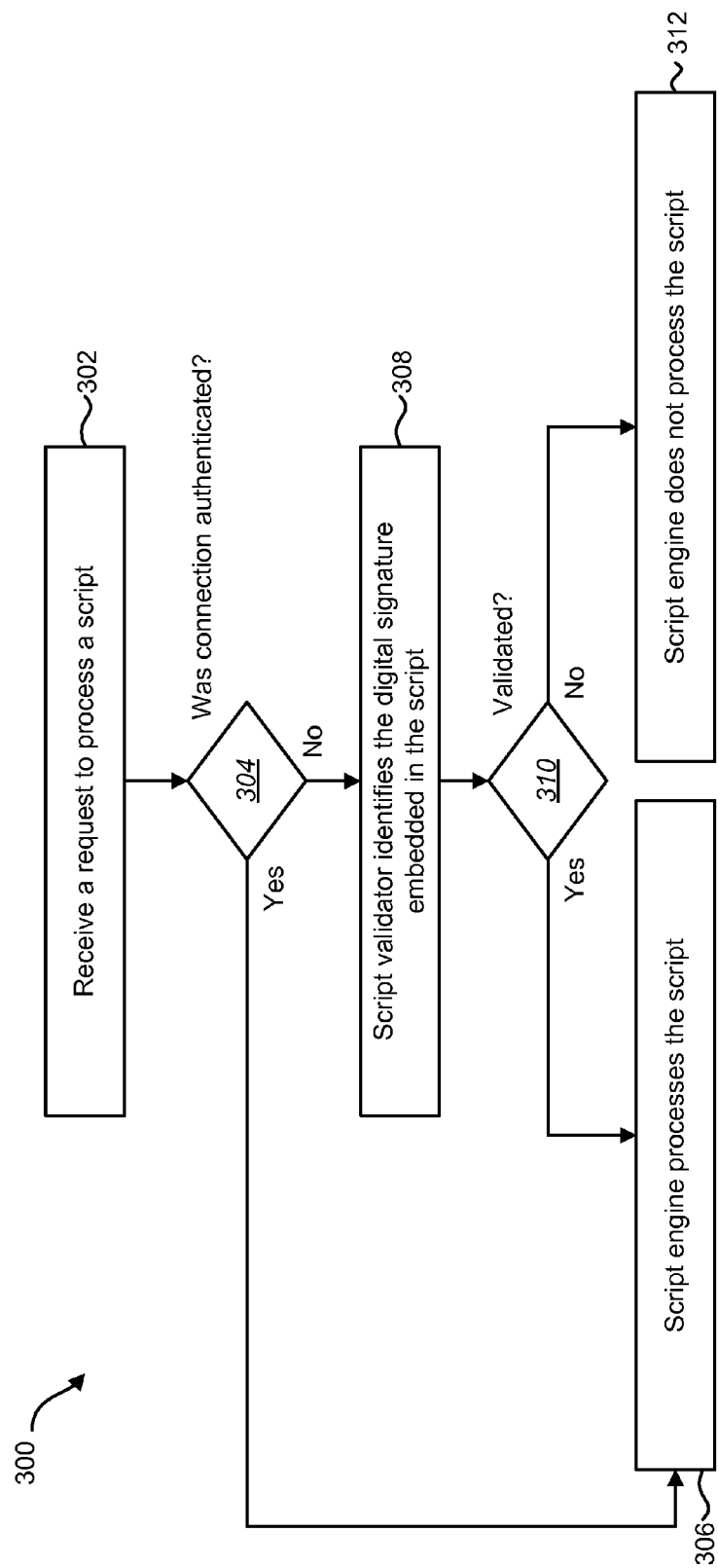
FIG. 3 illustrates an exemplary method that may be performed by various components in the managed node when a request to process a script is received.

FIG. 3 illustrates an exemplary method 300 that may be performed by various components in the managed node 104 when a request to process the script 222 is received 302. The script validator 116 determines 304 whether the request to process the script 222 comes from an authenticated connection. If so, the script engine 120 processes 306 the script 222.

If the request to process the script 222 does not come from an authenticated connection, the script validator 116 identifies 308 the digital signature 224 embedded in the script 222. This may be accomplished by searching for the signature tag 234 within the script 222.

The script validator 116 attempts 310 to validate the digital signature 224 that was identified in step 308. In some embodiments, this involves identifying which of the trusted certificates 118 has a hash that corresponds to the hash 236 included in the signature comment line 230. A digest is calculated on the contents of the batch file using the same method as was originally used. The digital signature 224 stored in the batch file is decrypted using the identified certificate 236. The decrypted digest is then compared with the calculated digest. If these digests match, then the digital signature 224 has been validated. If these strings do not match, then the digital signature 224 has not been validated.

If the script validator 116 is able to validate the digital signature 224, then the script engine 120 processes 306 the script 222. However, if the script validator 116 does not validate the digital signature 224, then the script engine 120 does not process 312 the script 222.

In some embodiments, scripts that are sent to the management agent 114 may include multiple digital signatures. When the management agent 114 receives a script that includes multiple digital signatures, the script engine 120 may be configured so that it does not process the script unless the script validator 116 has validated all of the digital signatures in the script. Alternatively, the script engine 120 may be configured so that it processes the script if the script validator 116 is able to validate any of the digital signatures in the script.

Figure 4:
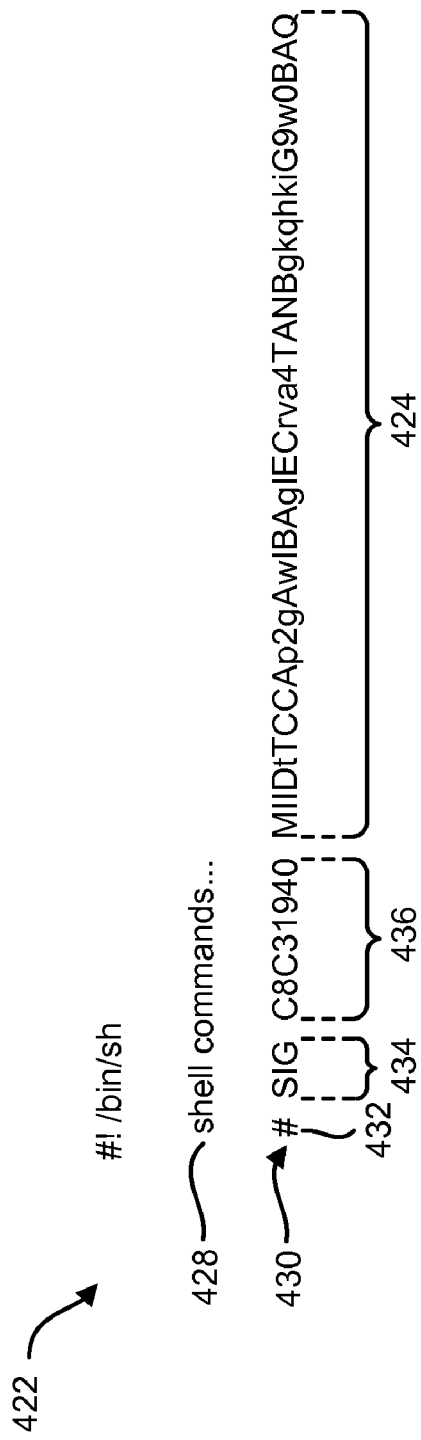
FIG. 4 illustrates another example of a script that may be used.

FIG. 4 illustrates another example of a script 422 that may be used. The script 422 shown in FIG. 4 is a shell script typical of Unix, Linux, and Mac OS X systems. The shell script 422 includes one or more shell commands 428 and a signature comment line 430. The signature comment line 430 includes a comment indicator 432, a signature tag 434, a certificate identifier 436, and a digital signature 424. The comment indicator 432 is the pound sign (#), which is the comment indicator for a shell script. The signature tag 434 is the string SIG.

Figure 5:
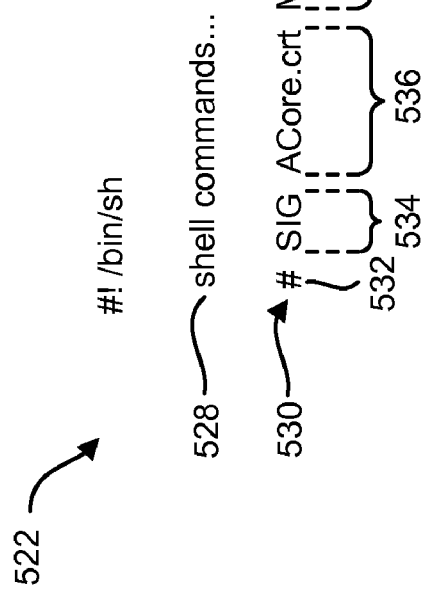
FIG. 5 illustrates another example of a script that may be used.

FIG. 5 illustrates another example of a script 522 that may be used. The script 522 shown in FIG. 5 is a shell script 522. The shell script 522 includes one or more shell commands 528 and a signature comment line 530. The signature comment line 530 includes a comment indicator 532, a signature tag 534, a certificate identifier 536, and a digital signature 524. The certificate identifier 536 is the name of the file in which the certificate corresponding to the key with which the digital signature 524 was created.

Figure 6:
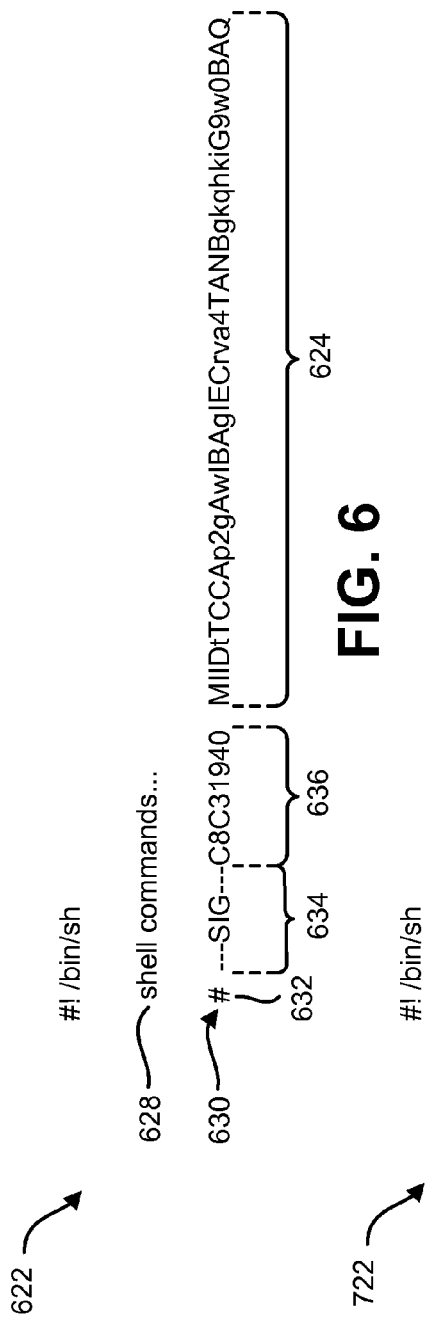
FIG. 6 illustrates another example of a script that may be used.

FIG. 6 illustrates another example of a script 622 that may be used. The script 622 shown in FIG. 6 is a shell script 622. The shell script 622 includes one or more shell commands 628 and a signature comment line 630. The signature comment line 630 includes a comment indicator 632, a signature tag 634, a certificate identifier 636, and a digital signature 624. The signature tag 634 is the string ---SIG---.

Figure 7:
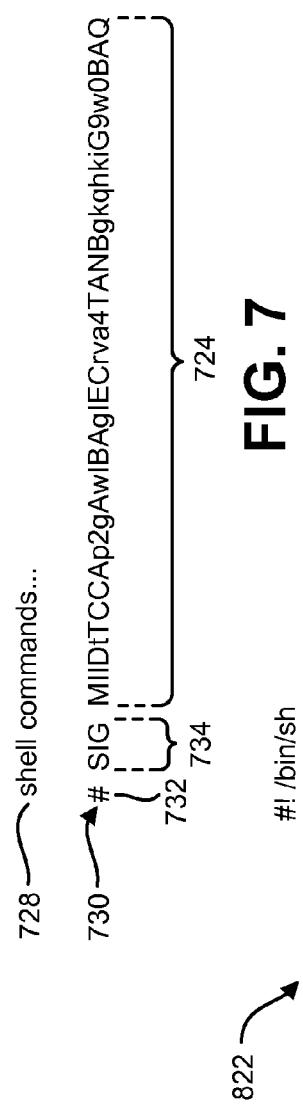
FIG. 7 illustrates another example of a script that may be used.

FIG. 7 illustrates another example of a script 722 that may be used. The script 722 shown in FIG. 7 is a shell script 722. The shell script 722 includes one or more shell commands 728 and a signature comment line 730. The signature comment line 730 includes a comment indicator 732, a signature tag 734, and a digital signature 724. However, the signature comment line 730 does not include a certificate identifier.

Figure 8:
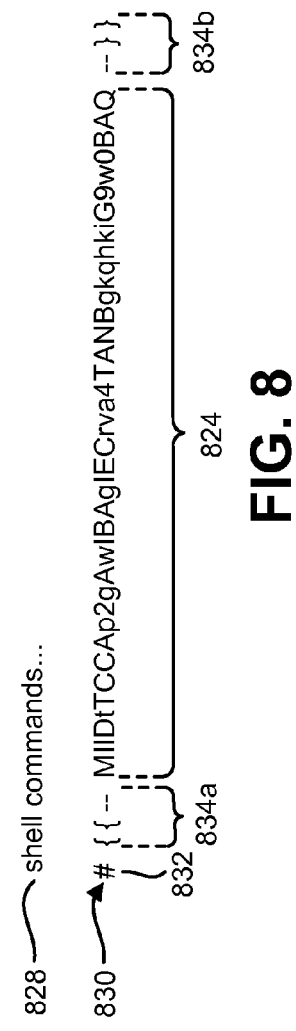
FIG. 8 illustrates another example of a script that may be used.

FIG. 8 illustrates another example of a script 822 that may be used. The script 822 shown in FIG. 8 is a shell script 822. The shell script 822 includes one or more shell commands 828 and a signature comment line 830. The signature comment line 830 includes a comment indicator 832 and a digital signature 824. The signature comment line 830 also includes a signature tag, which includes a prefix 834a that is located in front of the digital signature 824 and a suffix 834b that is located after the digital signature 824. The prefix 834a is the string {{--. The suffix 834b is the string --}}.

The techniques described above may be applied to other types of files that include computer instructions. For example, sometimes source code files are sent to another computer system (e.g., a managed node) where they are compiled and executed. One or more digital signatures may be embedded in comments within the source code files. A source code validator, similar to the script validator described above, may be provided to verify the trustworthiness of the source code file before compiling and executing it. Similar techniques may also be applied to binary files.

Figure 9:
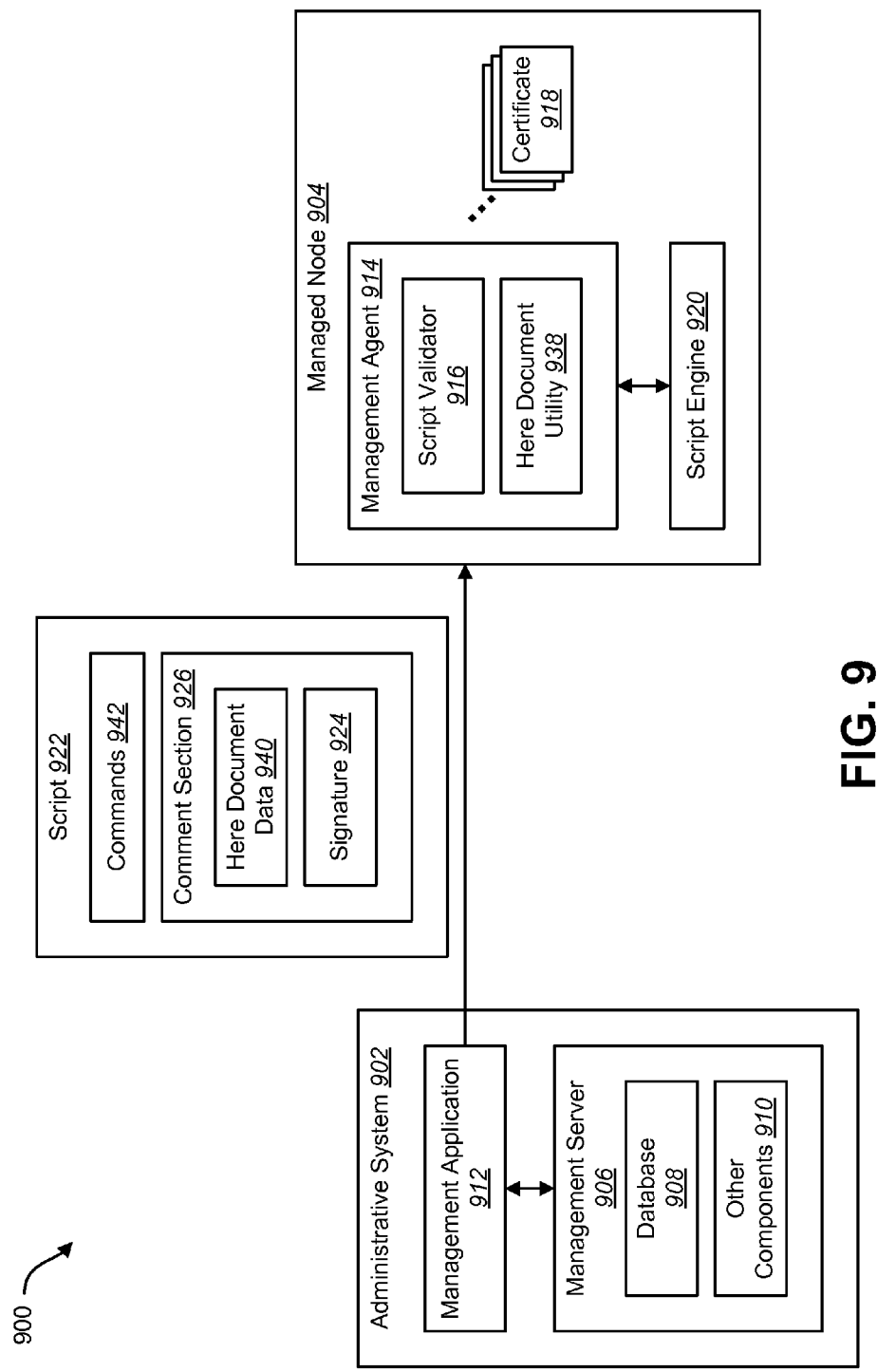
FIG. 9 illustrates another exemplary system in which some embodiments may be practiced.

FIG. 9 illustrates another exemplary system 900 in which some embodiments may be practiced. As before, the system 900 includes an administrative system 902 in electronic communication with a managed node 904. The administrative system 902 includes a management application 912 and a management server 906. The management server 906 may include a database 908 and other components 910. The managed node 904 includes a management agent 914, which includes a script validator 916. The managed node 904 also includes a script engine 920 and one or more trusted certificates 918. A script 922 that is sent to the managed node 904 includes a digital signature 924 embedded in a comment section 926 of the script 922. These components function similarly to the corresponding components shown in FIG. 1 and described in connection therewith.

Sometimes, a user of the administrative system 902 wants to update the managed node 904 by installing one or more files on the managed node 904. The files to be installed may be new files, or newer versions of files that have previously been installed on the managed node 904. One way to install files on the managed node 904 is to send the managed node 904 a script that includes a set of commands to download a file from a specified location. When the script engine 920 processes the script, this set of commands is executed and the files are downloaded to the managed node 904.

Another possibly more convenient way to install files on the managed node 904 is to embed the file(s) to be installed directly in a script that is sent to the managed node 904. Commands may be included in the script that cause these file(s) to be installed on the managed node 904 when the script is processed. This procedure eliminates the need for the managed node 904 to download the files.

In some operating systems, this latter approach may be facilitated by a here document command. A here document command instructs the script engine 920 to read a specified portion of the script. The portion of the script that is read is referred to as a "here document." Advantageously, the here document data that is included in a script does not have to conform to the syntax of the scripting language. In addition, commands may be included in the script that cause the script engine to write the here document data to a file. Thus, the here document command provides a convenient way for binary files to be embedded within a script in such a way that the binary file data is read from the script and written to a file when the script is processed.

For example, consider the following series of commands which may be included in a Linux or Unix shell script:

```
<<end>filename
binary file_data
end
```

The command <<end is a here document command. It instructs the script engine 120 to read binary_file_data (i.e., the binary file that has been embedded in the script). The command >filename instructs the script engine 120 to write binary_file_data to filename.

Some types of script engines do not support here document commands. For example, Windows/DOS-based script engines do not support here document commands. Thus, binary files may not be embedded in batch files (i.e., Windows/DOS-based scripts) using here document commands, as described above. Accordingly, there is a need for a way to be able to embed binary file(s) in certain types of scripts (e.g., batch files) in such a way that the embedded binary file data may be read from the script and written to a file when the script is processed. This would provide a convenient way for a user of an administrative system 902 to install files on a managed node 904, as described above.

In the illustrated embodiment, this functionality is achieved with a here document utility 938 that is included within the management agent 914. Here document data 940 is embedded within the comment section 926 of the script 922. The here document data 940 may be binary file data, or it may be another type of data. In addition, various commands 942 are included in the script 922. These commands 942, when executed, cause the here document utility 938 to be launched, and instruct the here document utility 938 to extract the here document data 940 from the script 922 and write the here document data 940 to a file on the managed node 904. Additional details about various embodiments of the script 922 and the here document utility 938 will be provided below.

FIG. 10 illustrates an exemplary script 1022 that may be used. The script 1022 is a Windows/DOS batch file 1022. The script 1022 includes a signature comment line 1030. The signature comment line 1030 is formatted similarly to the signature comment lines discussed above. In particular, the signature comment line 1030 includes a comment indicator 1032, a signature tag 1034, a certificate identifier 1036, and a digital signature 1024.

Here document data 1040 is embedded within the batch file 1022. The here document data 1040 that is shown in FIG. 10 is a message. However, in alternative embodiments the here document data 1040 may be a binary file, or another type of data. The here document data 1040 is included in a comments section 1026 of the batch file 1022. In other words, each line of the here document data 1040 is prefixed with REM, which is the comment indicator for Windows/DOS batch files. The here document data 1040 is compressed and encrypted. The compressed, encrypted here document data 1040 is included in the batch file 1022 in the form of ASCII-armored text.

The batch file 1022 includes a command 1044 to launch the here document utility 938. This command 1044 may be referred to herein as a launch command 1044. In the illustrated embodiment, the here document utility 938 is an implementation of OpenPGP called ldpgp.exe.

The batch file 1022 also includes several commands that are provided to the here document utility 938 once it has been launched. For example, the batch file 1022 includes a command 1046 for the here document utility 938 to read the here document data 1040 from the batch file 1022, to decompress it, and to decrypt it. This command may be referred to herein as an input command 1046.

The batch file 1022 also includes a command 1048 to write the decompressed, decrypted here document data 1040 to a specific file, namely c:\message.txt. This command may be referred to herein as an output command 1048.

The comment lines 'REM -----BEGIN PGP MESSAGE-----' and 'REM-----END PGP MESSAGE----' are the beginning and ending sentinels for the here document. The comment lines between these two lines contain the compressed and perhaps encrypted data encoded in a base 64 format. Base 64 format is used to insure that no unacceptable (binary) characters are included in the script 1022. Such binary characters can cause unexpected results when the script engine 920 processes the script 1022.

The 'REM' portion of the comment lines is ignored when converting the here document data 1040 back into its original format. Multiple here documents can be stored in the script 1022, each being delimited with the sentinel lines. When this is done, a mechanism to distinguish between the documents may be used. This can be as simple as using the position (or order) of the individual documents in the file. Alternatively, additional comments could be used to indicate a filename. Alternatively still, a label of some sort could be used to indicate which document to use.

The batch file 1022 also includes a command 1050 which tells the script engine 920 that the input is a batch file 1022. This tells the script engine 920 to ignore everything outside of the beginning and ending sentinels, and to also ignore the 'REM' at the beginning of each line within the sentinels. Without the command 1050, the script engine 920 may assume that all data within the sentinels is part of the base 64 encoded data. In a batch file 1022 the 'REM' causes the script engine 920 to ignore the lines containing the here document data 1040. The command 1050 is particular to the illustrated embodiment.

The "%0" parameter identifies the file that contains the encoded 'here' document. All other parameters are particular to the illustrated embodiment. The other information can either be inferred or extracted from the PGP data. More specifically, the PGP standard supports putting the filename in the literal data packet. It is also possible that the application could assume a well-known batch file location.

FIG. 10A illustrates another exemplary script 1022A that may be used. This script 1022A includes three here documents, namely a first here document 1040A, a second here document 1042A, and a third here document 1044A. Each here document 1040A, 1042A, 1044A has its file name embedded into the PGP literal data packet, so a single call may be used to extract all three documents. The filenames in this example (message.txt, two.txt, and three.txt) are embedded in the document and so the order of the PGP messages is not important.

Figure 11:
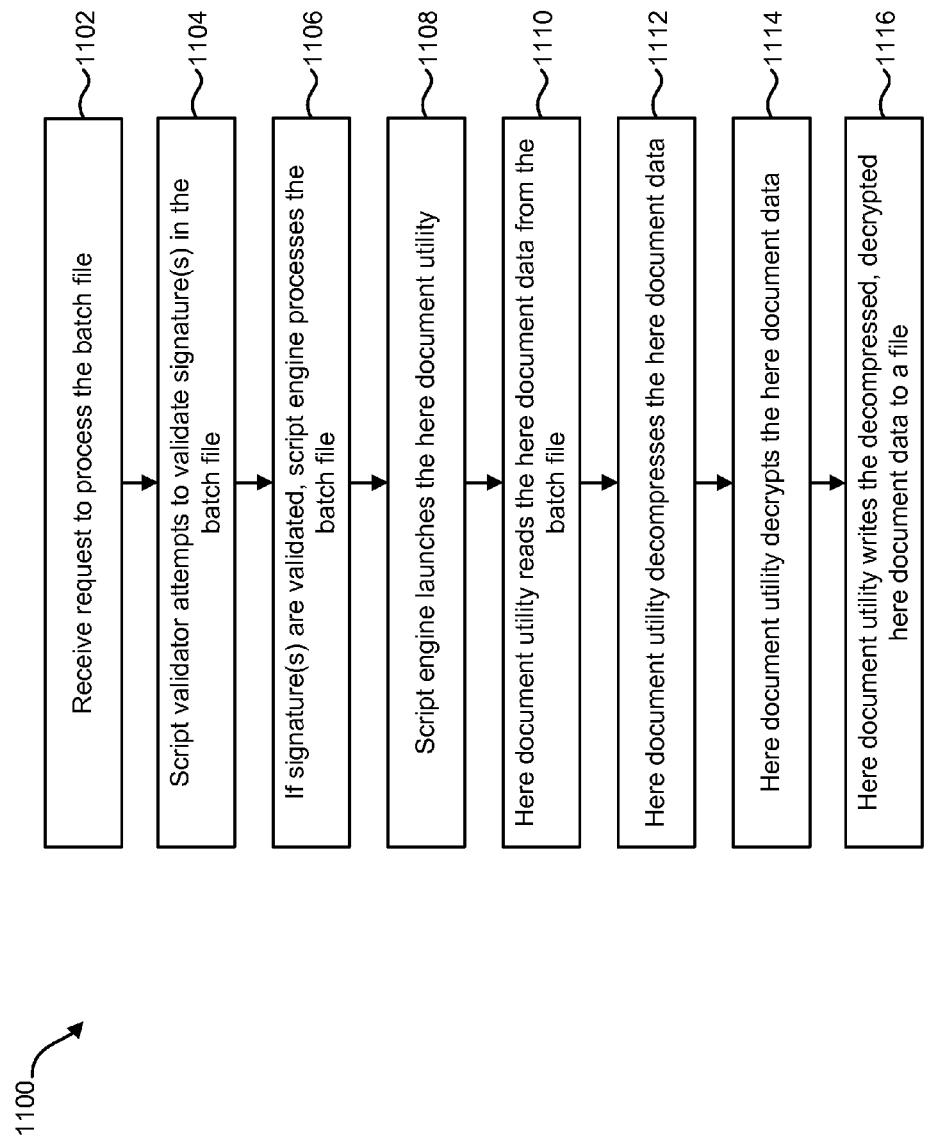
FIG. 11 illustrates an exemplary method that may be performed by the various components in the managed node when a request to process a batch file is received.

FIG. 11 illustrates an exemplary method 1100 that may be performed by the various components in the managed node 904 when a request to process the batch file 1022 is received 1102. The script validator 916 attempts 1104 to validate the digital signature 1024 in the batch file 1022, as described previously. If the signature 1024 is validated, the script engine 920 processes 1106 the batch file 1022.

As the batch file 1022 is processed, the script engine 920 processes the launch command 1044 in the batch file 1022. In response to processing the launch command 1044, the script engine 120 launches 1108 the here document utility 938.

The input command 1046 in the batch file 1022 is provided to the here document utility 938. In response to processing the input command 1046, the here document utility 938 reads 1110 the here document data 1040 from the batch file 1022, decompresses 1112 it, and decrypts 1114 it.

The output command 1048 in the batch file 1022 is provided to the here document utility 938. In response to processing the output command 1048, the here document utility 938 writes 1116 the decompressed, decrypted here document data 1040 to a file on the managed node 904.

The embodiments of the script validator and the here document utility described herein have been included within a management agent that is running on a managed node. However, embodiments of the script validator and/or here document utility may be used in a wide variety of other operating environments. For example, the script validator and/or here document utility may be included in a computer system that receives updates from an original equipment manufacturer (OEM). The script validator may be used to verify the trustworthiness of scripts that it receives from the OEM, as described above. The here document utility may be used to enable the OEM to embed binary files in scripts that are sent to the computer system, as described above.

Although some embodiments have been described in terms of a script being sent from one computer to another, the techniques disclosed herein may also be applicable to scripts that are used locally. For example, if an application running under a lesser privileged user account needed to do something at a system level account, the application could send a signed script to itself. This signed script may have been downloaded from another system (e.g., an administrative system) earlier.

Figure 12:
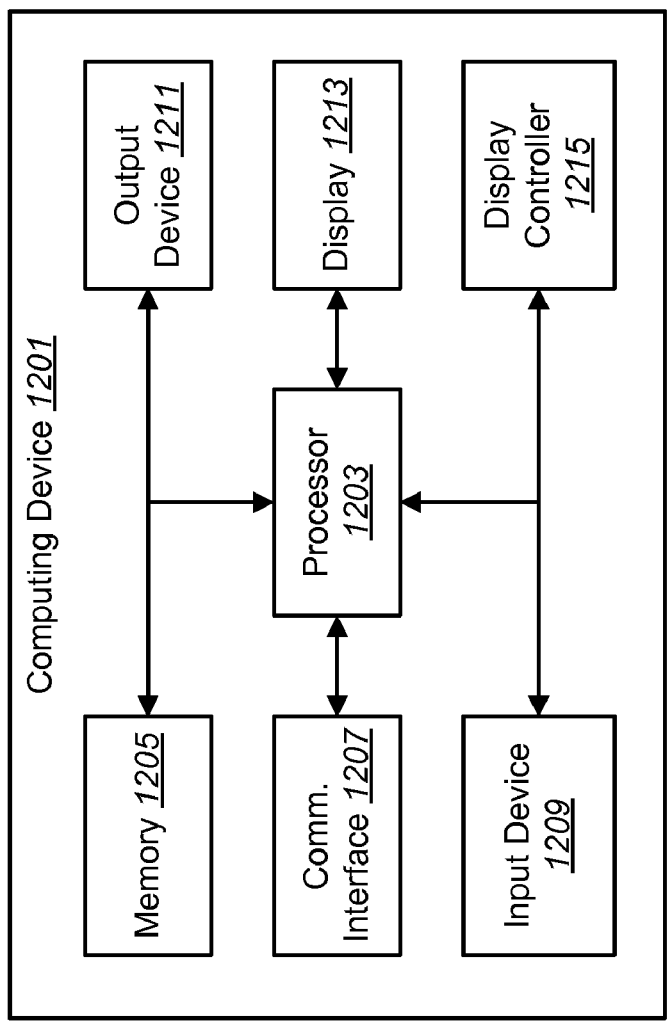
FIG. 12 is a block diagram illustrating the major hardware components typically utilized in a computer system.

FIG. 12 is a block diagram illustrating the major hardware components typically utilized in a computer system 1201, such as an administrative system and/or a managed node. The illustrated components may be located within the same physical structure or in separate housings or structures.

The computer system 1201 includes a processor 1203 and memory 1205. The processor 1203 controls the operation of the computer system 1201 and may be embodied as a microprocessor, a microcontroller, a digital signal processor (DSP) or other device known in the art. The processor 1203 typically performs logical and arithmetic operations based on program instructions stored within the memory 1205.

As used herein, the term memory 1205 is broadly defined as any electronic component capable of storing electronic information, and may be embodied as read only memory (ROM), random access memory (RAM), magnetic disk storage media, optical storage media, flash memory devices in RAM, on-board memory included with the processor 1203, EPROM memory, EEPROM memory, registers, etc. The memory 1205 typically stores program instructions and other types of data. The program instructions may be executed by the processor 1203 to implement some or all of the methods disclosed herein.

The computer system 1201 typically also includes one or more communication interfaces 1207 for communicating with other electronic devices. The communication interfaces 1207 may be based on wired communication technology, wireless communication technology, or both. Examples of different types of communication interfaces 1207 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1201 typically also includes one or more input devices 1209 and one or more output devices 1211. Examples of different kinds of input devices 1209 include a keyboard, mouse, microphone, remote control device, button, joystick, trackball, touchpad, lightpen, etc. Examples of different kinds of output devices 1211 include a speaker, printer, etc. One specific type of output device which is typically included in a computer system is a display device 1213. Display devices 1213 used with embodiments disclosed herein may utilize any suitable image projection technology, such as a cathode ray tube (CRT), liquid crystal display (LCD), light-emitting diode (LED), gas plasma, electroluminescence, or the like. A display controller 1215 may also be provided, for converting data stored in the memory 1205 into text, graphics, and/or moving images (as appropriate) shown on the display device 1213.

Of course, FIG. 12 illustrates only one possible configuration of a computer system 1201. Those skilled in the art will recognize that various other architectures and components may be utilized.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for verifying the trustworthiness of a file comprising computer instructions, the method comprising:
   receiving a request to process the file;
   identifying a digital signature embedded in comments within the file;
   attempting to validate the digital signature;
   if the digital signature is validated, processing the file; and
   if the digital signature is not validated, not processing the file.

2. The method of claim 1, wherein the file is a script.

3. The method of claim 1, wherein the file is a source code file.

4. The method of claim 1, wherein the file is a binary file.

5. The method of claim 1, further comprising determining whether a connection through which the request is received is authenticated, and wherein the step of attempting to validate the signature is only performed if the connection is not authenticated.

6. The method of claim 1, wherein the file comprises multiple digital signatures.

7. The method of claim 6, wherein the method comprises attempting to validate all of the multiple digital signatures, and wherein the file is processed only if all of the multiple digital signatures are validated.

8. The method of claim 6, wherein the file is processed if any of the multiple digital signatures are validated.

9. The method of claim 1, wherein the method is performed by a managed node in a computer network, and wherein the request is received from an administrative system for the computer network.

10. The method of claim 1, wherein the request is received from an original equipment manufacturer system.

11. A computer system configured for verifying the trustworthiness of a file comprising computer instructions, the computer system comprising:
    a processor;
    memory in electronic communication with the processor;
    instructions stored in the memory, the instructions being executable to:
      receive a request to process the file;
      identify a digital signature embedded in comments within the file;
      attempt to validate the digital signature;
      if the digital signature is validated, process the file; and
      if the digital signature is not validated, not process the file.

12. The computer system of claim 11, wherein the file is a script.

13. The computer system of claim 11, wherein the file comprises multiple digital signatures.

14. A computer-readable medium stored on a storage medium, the computer-readable medium comprising executable instructions for verifying the trustworthiness of a file comprising computer instructions, the instructions being executable to:
    receive a request to process the file;
    identify a digital signature embedded in comments within the file;
    attempt to validate the digital signature;
    if the digital signature is validated, process the file; and
    if the digital signature is not validated, not process the file.

15. The computer-readable medium of claim 14, wherein the file is a script.

16. The computer-readable medium of claim 14, wherein the file comprises multiple digital signatures.

17. A file that is configured to allow verification of the file by a validator on a computer system, the file comprising:
    computer instructions;
    a signature comment line;
    a comment indicator at the beginning of the signature comment line;
    a signature tag within the signature comment line; and
    a digital signature within the signature comment line.

18. The file of claim 17, wherein the file is a script.

19. The file of claim 17, further comprising a certificate identifier within the signature comment line.

20. The file of claim 17, further comprising multiple digital signatures.

21. A method for simplifying the process of receiving updates, or new software, for a computer system, comprising:
    a script engine receiving a request to process a script that comprises here document data;
    the script engine receiving the script;
    the script engine processing the script;
    in response to processing the script, the script engine launching a here document utility, and the here document utility reading the here document data from the script and writing the here document data to a file.

22. The method of claim 21, wherein the script is a batch file.

23. The method of claim 21, wherein the here document data is binary file data.

24. The method of claim 21, further comprising, in response to processing the script, the here document utility decrypting the here document data.

25. The method of claim 21, further comprising, in response to processing the script, the here document utility decompressing the here document data.

26. The method of claim 21, further comprising:
    a script validator identifying a digital signature in the script; and
    the script validator attempting to validate the digital signature, wherein the script engine processes the script only if the digital signature is validated.

27. The method of claim 21, further comprising:
    a script validator identifying multiple digital signatures in the batch file; and
    the script validator attempting to validate all of the multiple digital signatures, wherein
    the script engine processes the batch file only if all of the multiple digital signatures are validated.

28. The method of claim 21, further comprising:
    a script validator identifying multiple digital signatures in the batch file; and
    the script validator attempting to validate at least one of the multiple digital signatures, wherein the script engine processes the batch file if any of the multiple digital signatures are validated.

29. The method of claim 21, wherein the method is performed by a managed node in a computer network, and wherein the request is received from an administrative system for the computer network.

30. The method of claim 21, wherein the request is received from an original equipment manufacturer system.

31. A computer system that is configured for simplifying the process of receiving updates, or new software, for a computer system, the computer system comprising:
- a processor;
- memory in electronic communication with the processor;
- a script engine;
- a here document utility;
- instructions stored in the memory, the instructions being executable to:
  - receive by the script engine a request to process a script that comprises here document data;
  - receive the script by the script engine;
  - process the script by the script engine; and
  - in response to processing the script, launch by the script engine the here document utility, the here document utility reading the here document data from the script and writing the here document data to a file.

32. The computer system of claim 31, wherein the script is a batch file.

33. The computer system of claim 31, wherein the here document data is binary file data.

34. The computer system of claim 31, further comprising a script validator, and wherein the instructions are further executable to:
- identify by the script validator a digital signature in the script; and
- attempt to validate by the script validator the digital signature, wherein the script engine processes the script only if the digital signature is validated.

35. A computer-readable medium stored on a storage medium, the computer-readable medium comprising executable instructions for simplifying the process of receiving updates, or new software, for a computer system, instructions being executable to:
- receive by a script engine a request to process a script that comprises here document data;
- receive the script by the script engine;
- process the script by the script engine;
- in response to processing the script, launch by the script engine a here document utility, the here document utility reading the here document data from the script and writing the here document data to a file.

36. The computer-readable medium of claim 35, wherein the script is a batch file.

37. The computer-readable medium of claim 35, wherein the here document data is binary file data.

38. The computer-readable medium of claim 35, wherein the instructions are further executable to:
- identify by a script validator a digital signature in the script; and
- attempt by the script validator to validate the digital signature, wherein the script engine processes the script only if the digital signature is validated.

39. A script that simplifies the process of updating a computer system, comprising: here document data;
- a launch command that instructs a script engine to launch a here document utility;
- an input command that instructs the here document utility to read the here document data from the script; and
- an output command that instructs the here document utility to write the here document data to a file.

40. The script of claim 39, wherein the here document data is binary file data.

* * * * *